US012073278B2

(12) United States Patent
Andre et al.

(10) Patent No.: US 12,073,278 B2
(45) Date of Patent: Aug. 27, 2024

(54) ELECTRONIC PAYMENT TERMINAL AND CORRESPONDING METHOD FOR OPTIMISING OPERATION AND COMPUTER PROGRAM

(71) Applicant: BANKS AND ACQUIRERS INTERNATIONAL HOLDING, Paris (FR)

(72) Inventors: Jérôme Andre, Montoison (FR); Olivier Soleilhavoup, Lyons (FR); Yann Granddidier, Lemps (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 41 days.

(21) Appl. No.: 17/778,631

(22) PCT Filed: Nov. 3, 2020

(86) PCT No.: PCT/EP2020/080813
§ 371 (c)(1),
(2) Date: May 20, 2022

(87) PCT Pub. No.: WO2021/099108
PCT Pub. Date: May 27, 2021

(65) Prior Publication Data
US 2022/0414354 A1 Dec. 29, 2022

(30) Foreign Application Priority Data
Nov. 21, 2019 (FR) ...................................... 1913032

(51) Int. Cl.
G06K 7/08 (2006.01)
(52) U.S. Cl.
CPC .................................. G06K 7/087 (2013.01)

(58) Field of Classification Search
CPC ............ G06Q 20/341; G06Q 20/3278; G06K 7/10237; G06K 19/07707;
(Continued)

(56) References Cited

U.S. PATENT DOCUMENTS

| 11,551,200 B1* | 1/2023 | Cook | G06Q 20/204 |
| 2005/0236480 A1 | 10/2005 | Vrotos et al. | |
| 2005/0269402 A1* | 12/2005 | Spitzer | G06Q 20/385 |
| | | | 235/449 |

FOREIGN PATENT DOCUMENTS

| EP | 2040228 A1 | 3/2009 | |
| WO | 2016030893 | * 3/2016 | ......... G06K 7/10237 |
| WO | 2019162674 | * 8/2019 | ......... G06K 19/0716 |

OTHER PUBLICATIONS

English translation of the Written Opinion of the International Searching Authority dated Jan. 22, 2021 for corresponding International Application No. PCT/EP2020/080813, filed Nov. 3, 2020.
(Continued)

Primary Examiner — Daniel St Cyr
(74) Attorney, Agent, or Firm — David D. Brush; Westman, Champlin & Koehler, P.A.

(57) ABSTRACT

An electronic payment terminal including a magnetic-memory card reader and a card passage, wherein a magnetic-memory card is intended to slide. The card passage extends in a plane substantially parallel to a top face of the electronic payment terminal. At one end of the housing of the electronic payment terminal, a part of the bottom wall of the card passage extends beyond the top wall of the card passage. The electronic payment terminal furthermore includes at least one first front camera integrated at the end of the electronic payment terminal, in a plane substantially parallel to the top face of the electronic payment terminal, below the bottom wall of the card passage extending beyond the top wall of the card passage.

12 Claims, 5 Drawing Sheets

(58) Field of Classification Search
CPC ............. G06K 19/07749; G06K 7/087; G06K 19/0716; G06K 7/10336
USPC ................................................ 235/449, 493
See application file for complete search history.

(56) References Cited

OTHER PUBLICATIONS

International Search Report dated Jan. 13, 2021 for corresponding International Application No. PCT/EP2020/080813, Nov. 3, 2020.
Written Opinion of the International Searching Authority dated Jan. 13, 2021 for corresponding International Application No. PCT/EP2020/080813, filed Nov. 3, 2020.
French Search Report and Written Opinion with English machine translation dated May 27, 2020 for corresponding French Application No. 1913032, filed Nov. 21, 2019.

* cited by examiner

[Fig. 1]
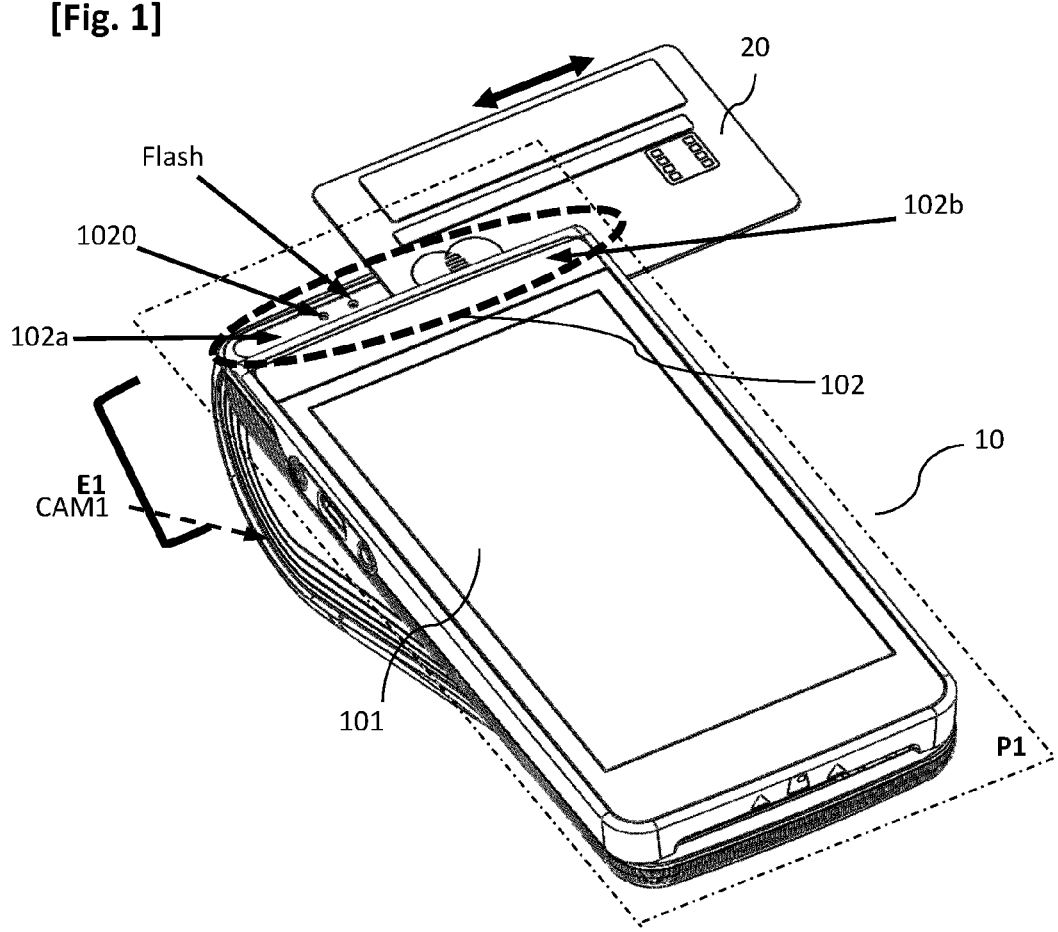
[Fig. 6]
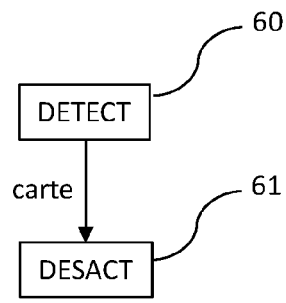

[Fig. 2a]
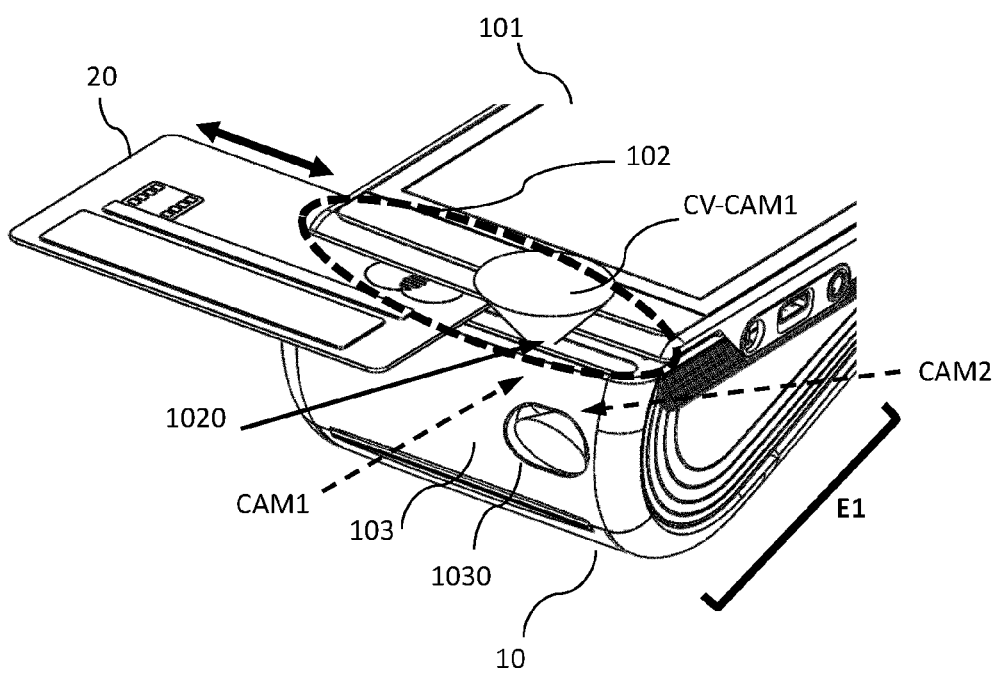
[Fig. 2b]
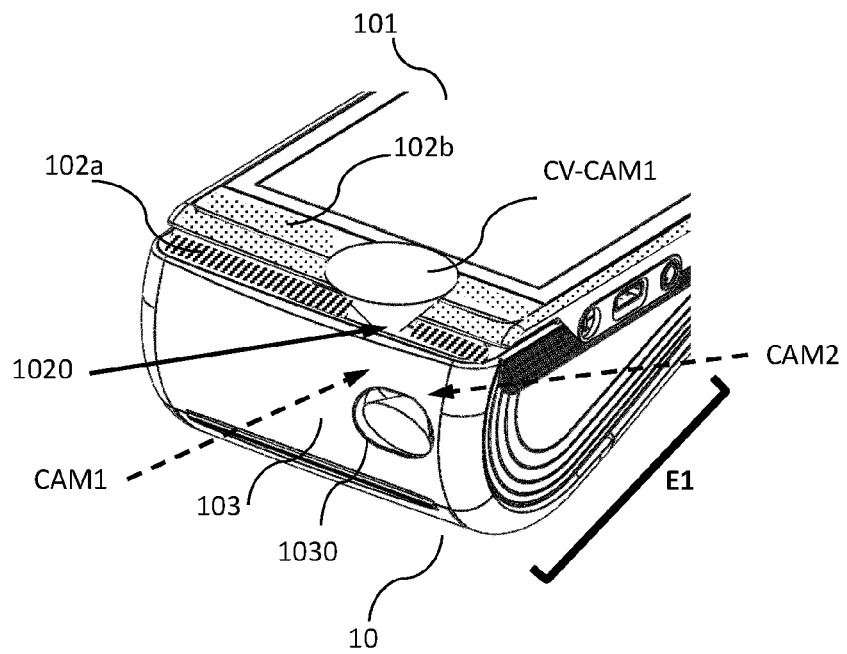

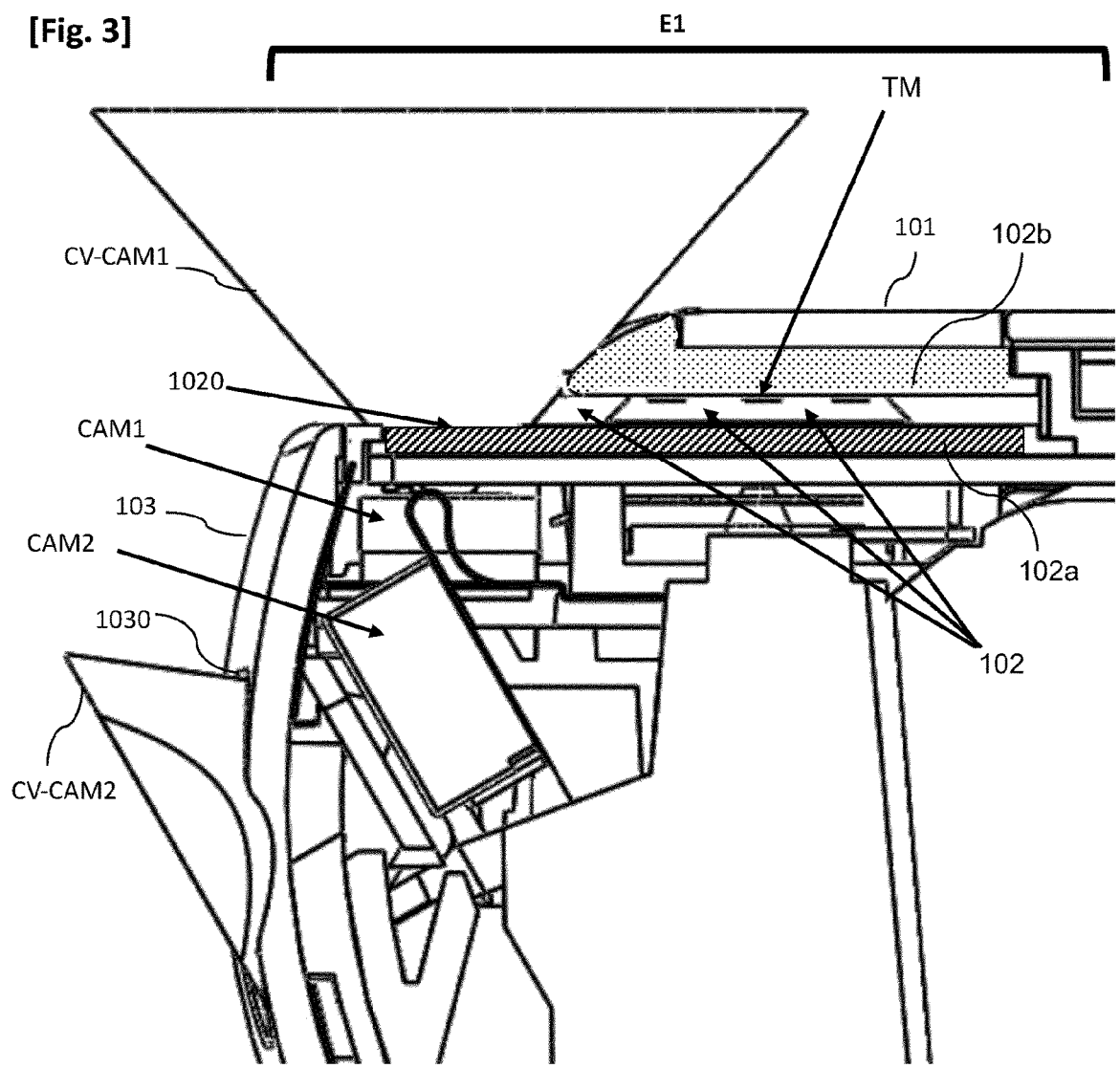
[Fig. 3]

[Fig. 4]
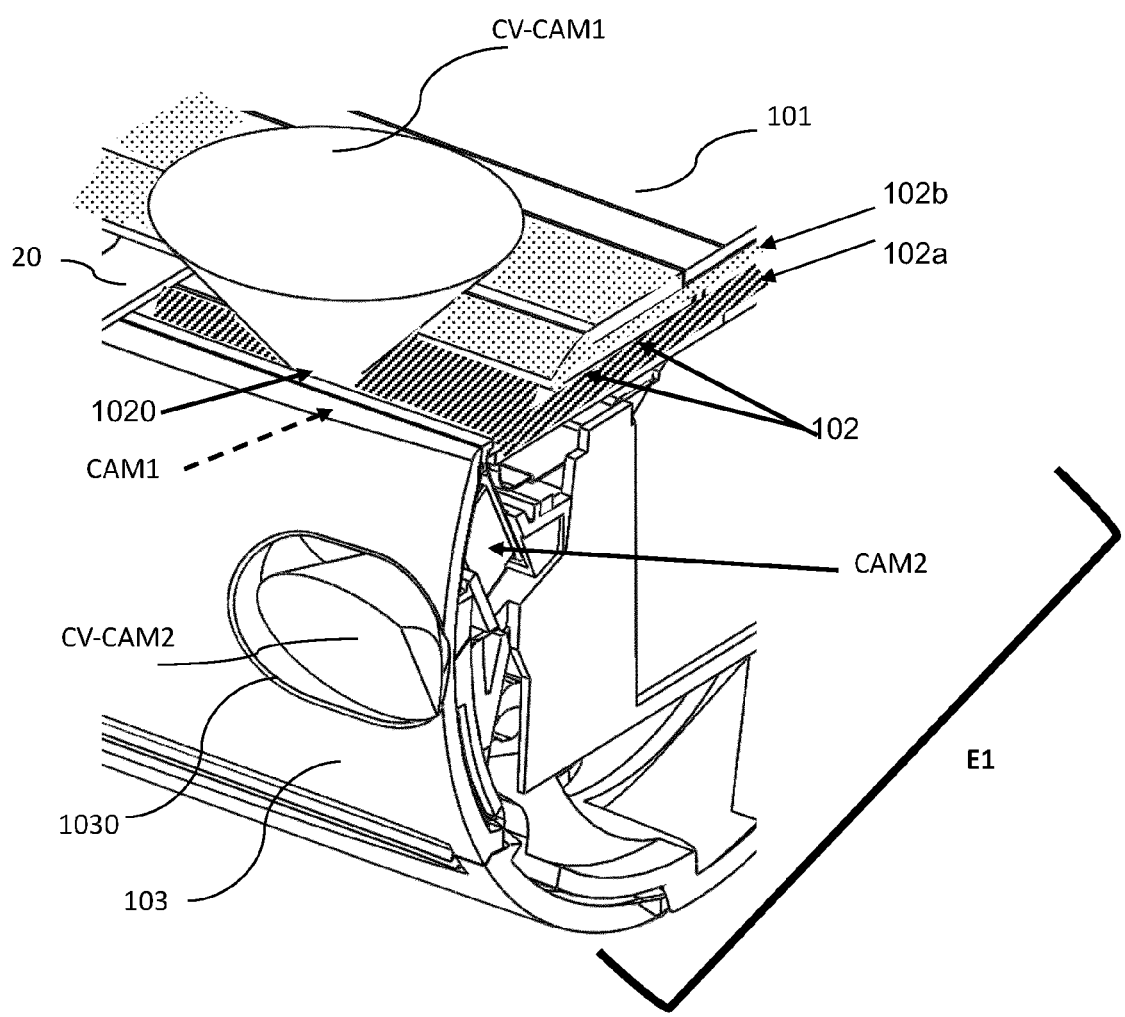

[Fig. 5a]
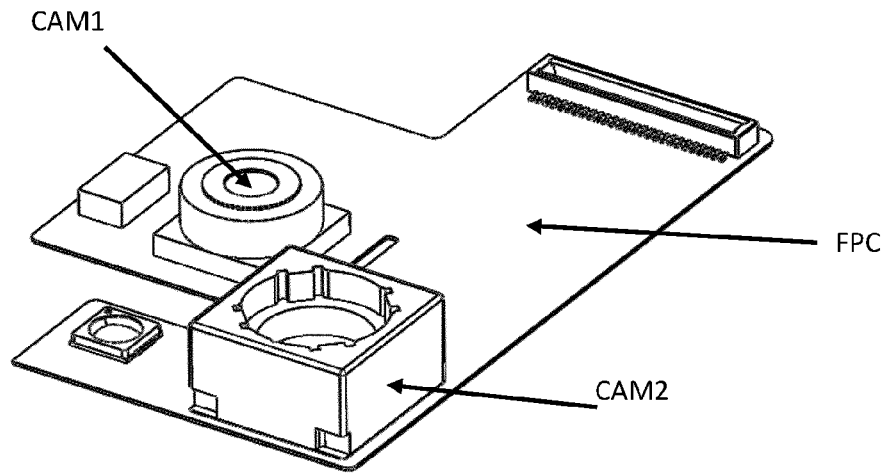
[Fig. 5b]
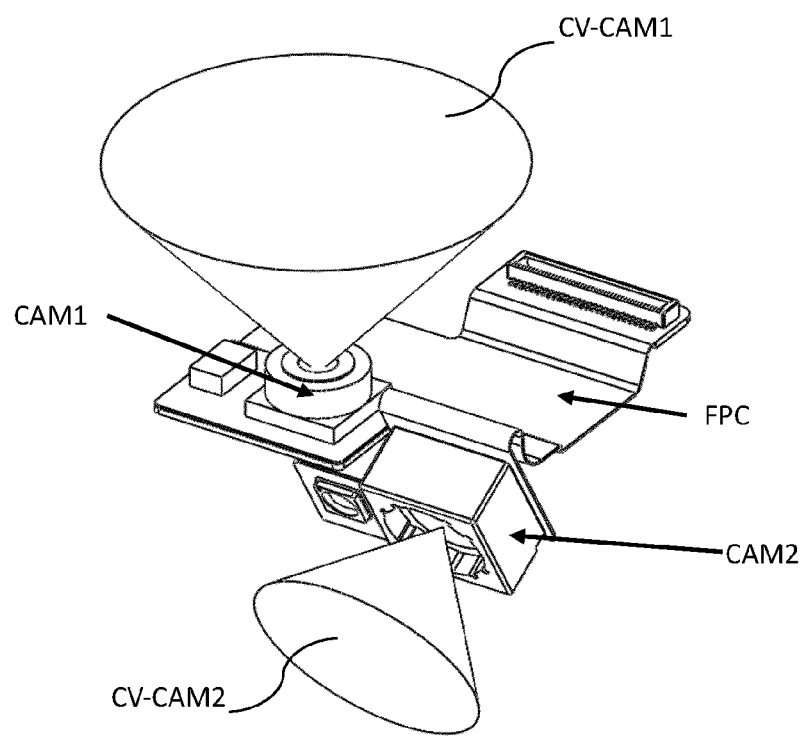

ELECTRONIC PAYMENT TERMINAL AND CORRESPONDING METHOD FOR OPTIMISING OPERATION AND COMPUTER PROGRAM

CROSS-REFERENCE TO RELATED APPLICATIONS

This Application is a Section 371 National Stage Application of International Application No. PCT/EP2020/080813, filed Nov. 3, 2020, which is incorporated by reference in its entirety and published as WO 2021/099108 A1 on May 27, 2021, not in English.

FIELD OF THE INVENTION

The field of the invention is that of electronic payment terminals having a magnetic card reader and a magnetic card passage. More specifically, the invention relates to the optimised integration of at least one camera (for example for reading barcodes) in such an electronic payment terminal.

PRIOR ART AND DRAWBACKS THEREOF

The remainder of this document devotes itself to describing a problem existing in the field of electronic payment terminals with which the inventors of the present patent application were confronted. The invention is of course not limited to this particular field of the application, but has an interest for the conjoint integration of a camera and of a magnetic card reader in any type of electronic device that has to have optimum compactness.

Some current electronic payment terminals have a magnetic card reader associated with a card passage, which may prove to be a problem when optimum compactness is sought for these terminals. This is because the reliability of the magnetic card passage requires a minimum distance for optimum guidance of the card, giving rise to a space requirement that is difficult to make compatible with optimum compactness of the electronic payment terminal.

Moreover, some current electronic payment terminals also have one or two cameras, for example for reading barcodes or a facial recognition application. Integrating this camera (or these cameras) also presents additional constraints of size and space requirement, when optimum compactness is sought for these terminals, the camera or cameras having to be front and/or rear, in particular for use thereof for reading barcodes.

There is therefore a need for a solution making it possible to minimise the impact of the integration of a magnetic card reader and a front and/or rear camera in an electronic payment terminal, in terms of size of the electronic payment terminal, while degrading neither the performance of the magnetic card reader nor the performance of the camera or cameras.

DISCLOSURE OF THE INVENTION

The present disclosure makes it possible to at least partly solve some problems posed by the payment terminals of the prior art.

An electronic payment terminal is thus proposed, comprising a housing in the form substantially of a right-angled parallelepiped formed by an assembly of a plurality of faces, including a top face intended to face a user of the electronic payment terminal, the electronic payment terminal comprising a magnetic-memory card reader and a groove, referred to as a card passage, wherein a magnetic-memory card is intended to slide, the electronic payment terminal furthermore comprising at least one first front camera.

According to the present technique, the card passage extends in a plane substantially parallel to the top face of the electronic payment terminal, at one end of the housing of the electronic payment terminal, a part of the bottom wall of the card passage extending beyond the top wall of the card passage.

In addition, the first front camera is integrated at the end of the electronic payment terminal, in a plane substantially parallel to the top face of the electronic payment terminal, below the bottom wall of the card passage extending beyond the top wall of the card passage.

Finally, the visual cone of the first front camera is oriented mainly in a direction going from the bottom wall towards the top face of the electronic payment terminal.

Thus, the present technique proposes a novel and inventive solution allowing the integration of a magnetic-memory card reader and at least one camera in an electronic payment terminal, while optimising the compactness of the electronic payment terminal and respecting the optimum performances in magnetic reading and vision of the camera.

To do this, the magnetic-memory card reader, and the associated card passage, are integrated horizontally, at one end of the electronic payment terminal (for example above the screen, at the opposite end to the keypad) and at least one camera is integrated in the same plane, in a space provided between the card reader (protected by the external wall of the card passage) and the end of the card passage, i.e. where the interior wall of the card passage extends beyond the exterior wall (so that the camera is not obstructed by the card passage).

The horizontal implementation of the magnetic-memory card reader makes it possible to respect the dimensional constraints of the card passage, for optimum reading of the data of the magnetic-memory card, while making it possible to limit the thickness of the electronic payment terminal, which is not possible with a vertical card passage on one side of the terminal.

In addition, the front camera, as required for example for a barcode reading functionality, occupies a space making it possible also not to increase the size of the electronic payment terminal.

Finally, in integrating the camera, account can be taken of the architecture of each electronic payment terminal, by occupying a space left free by the integration of the horizontal magnetic card reader and of the card passage.

According to a particular aspect of the present technique, the bottom wall of the card passage has an opening located opposite the first front camera and the exterior surface of the first front camera is located below the plane of the bottom wall of the card passage.

Thus, according to this embodiment, the exterior surface, and therefore the window, of the camera is not flush in the plane of the interior wall of the card passage and is therefore protected from risks of wear and/or damage due to repeated passes of magnetic cards in the card passage. To do this, it is necessary to adapt the card passage, and in particular the plane of the bottom face thereof, to the dimensions of the camera, so that the latter does not project, or to adapt the plane on which the camera is installed to the configuration of the card passage.

It is also necessary to provide an opening in the bottom wall of the card passage, opposite the (front) camera.

This opening may have dimensions substantially identical to those of the camera.

According to a particular feature of the present technique, the electronic payment terminal comprises a second camera at the end of the electronic payment terminal, in a plane that is not parallel to the top face of the electronic payment terminal, the first and second cameras having two distinct vision angles.

Thus, according to this embodiment, it is even possible to integrate two cameras, with two distinct vision angles (a front camera and a rear camera for example), in the same space close to the card reader, without increasing the thickness or the size of the electronic payment terminal.

According to this embodiment, the electronic payment terminal comprises an opening provided in a rear face connecting the top face and the bottom face of the electronic payment terminal, the opening being located opposite the second camera and the exterior surface of the second camera being located below the plane of the rear face.

Thus, according to this embodiment, a window is provided on the cover of the electronic payment terminal, opposite the second camera, so as to enable shots to be taken with this second (rear) camera. Moreover, provision is also made, as for the first camera, for the exterior surface, and therefore the window, of the second camera not to be flush with the surface of this lateral face of the electronic payment terminal, for the same reasons of wear on this window.

According to a particular feature, the first second cameras are integrated on the same flexible printed circuit.

Thus, according to this embodiment, integrating two cameras is simple since they are located on one and the same flexible printed circuit, able to be folded so as to make it possible to orient the two cameras at two distinct vision angles, as required by the various applications sought for these two cameras.

The present technique also relates to a method for optimising the operation of an electronic payment terminal as described previously, comprising the following steps:
detecting, via the first front camera, the presence of a magnetic card in the card passage;
deactivating the contactless functionality of the electronic payment terminal.

Such a method makes it possible in particular to reduce the energy consumption of the electronic payment terminal, via deactivation of the contactless functionality, which requires detecting the presence of a contactless payment means and therefore consumes energy as soon as a payment means is requested of the user during a transaction.

Finally, the present technique relates to a computer program product that can be downloaded from a communication terminal and/or stored on a medium that can be read by computer and/or can be executed by a microprocessor, comprising program code instructions for implementing a method for optimising the operation of an electronic payment terminal as described previously, when it is executed by a processor.

LIST OF FIGURES

Other aims, features and advantages of the invention will emerge more clearly from the reading of the following description, given by way of simple illustrative and non-limitative example, in relation to the figures, among which:

FIG. 1 illustrates an example of an electronic payment terminal according to an embodiment of the proposed technique;

FIG. 2a shows one end of the electronic payment terminal illustrated in FIG. 1 according to an embodiment of the technique proposed with a magnetic card sliding in the card passage;

FIG. 2b shows the end of the electronic payment terminal illustrated in FIG. 2a without the magnetic card sliding in the card passage;

FIG. 3 illustrates a cross-sectional view in profile of the end of the electronic payment terminal illustrated in FIG. 2b;

FIG. 4 illustrates a cross-sectional view in profile and of the rear of the end of the electronic payment terminal illustrated in FIG. 2a;

FIG. 5a illustrates an example of a flexible printed circuit with two cameras according to one embodiment of the technique proposed;

FIG. 5b illustrates the flexible printed circuit illustrated in FIG. 5a in a folded position;

FIG. 6 illustrates the main steps of a method for optimising the operation of an electronic payment terminal as illustrated in FIG. 1.

DETAILED DESCRIPTION OF EMBODIMENTS OF THE INVENTION

The general principle of the invention is based on the use, at one end of an electronic payment terminal, of a magnetic card reader that is "horizontal" or more precisely is in the same plane as the top face of the electronic payment terminal turned towards the user (conventionally the face with a screen and a keypad), with a magnetic card passage that is also "horizontal", and the integration of at least one camera in a space close to the magnetic reading head and to the card passage.

In this way, the thickness of the electronic payment terminal is optimised, since the "horizontal" card passage does not impose a minimum height on a side of the electronic payment terminal, conventionally the right-hand side as in the known electronic payment terminals. Thus, the compactness of such an electronic payment terminal is superior to the existing electronic payment terminals, while respecting the necessary distance of passage of the card for ensuring optimum reading of the data of the card. Finally, this solution also makes it possible to ensure good vision via the camera or cameras.

This is because, by profiting from this original architecture with a magnetic card passage in the plane of the top face of the electronic payment terminal, the inventors had the idea of integrating the front camera in the offset formed by the two walls of the magnetic card passage, so as to also minimise the impact of the integration of this camera. It is also possible to integrate a second, rear, camera (therefore with a vision angle different from the front camera), in this same zone of the end of the electronic payment terminal, without impact on the compactness of the electronic payment terminal.

These various aspects of the present technique are presented in more detail, in relation to FIGS. 1 to 5b.

FIG. 1 illustrates an example of an electronic payment terminal 10 having firstly a card passage 102 (identified by an oval shape in bold broken lines) located at one of the ends E1 of the electronic payment terminal 10, in the same plane P1 (shown in fine broken lines) as the top face 101 of the electronic payment terminal 10. The end E1 of this embodiment corresponds to the "top" part of the electronic payment terminal, when it is used, i.e. the part located above the screen.

The selection of this end E1 of the electronic payment terminal 10 is in fact very ergonomic for the user and allows sliding of the magnetic card in the card passage 102 easily, while being effective in terms of reading the data of the magnetic card during sliding thereof in the card passage. In addition, this end E1 of the electronic payment terminal can be slightly raised, because of a greater thickness of this end E1 with respect to the rest of the electronic payment terminal (as illustrated in FIG. 1), and thereby favours the sliding of the card in the card passage 102, even when the electronic payment terminal is positioned on a support.

For example, on this FIG. 1, a magnetic card 20 is illustrated sliding in the card passage 102, between the two bottom 102a and top 102b walls. The technical features relating to the implementation of the magnetic card reader and in particular of the magnetic reading head will be described in more detail below, in relation to FIG. 3.

It can however be noted that the bottom wall 102a of the card passage 102 extends beyond the top wall 102b, so as to allow in particular the integration of a so-called front camera at this end E1 of the electronic payment terminal.

This is because, according to this embodiment, an opening 1020 is provided on the bottom wall 102a of the card passage 102, so as to allow photographing via a first camera CAM1 (not illustrated) located inside the electronic payment terminal 10. The configuration, the dimensions and the positioning of this opening 1020 are advantageously selected to optimise the performances of the first camera CAM1. The technical features relating to the use of this first camera CAM1 will be described in more detail below, from FIG. 3.

Finally, on this FIG. 1, another opening is noted, provided for allowing the use of a flash with the first camera CAM1.

FIG. 2a and FIG. 2b show the end E1 of the electronic payment terminal 10 illustrated in FIG. 1, respectively with a magnetic card 20 sliding in the card passage 102 and without the magnetic card.

These figures make it possible in particular to illustrate the visual cone CV-CAM1 of the first camera CAM1 (not illustrated), through the opening 1020 provided on the bottom wall 102a of the card passage 102.

FIG. 2a makes it possible in particular to see that, when the magnetic card 20 is moving/sliding in the card passage 102, to be read by the magnetic card reader of the electronic payment terminal 10, it passes above this opening 1020 and therefore in front of the camera CAM1. This feature makes it possible in particular to envisage an additional functionality of the electronic payment terminal, namely detecting the passage of a magnetic card in front of the camera CAM1 for example to deactivate the "contactless" functionality and thus to save on the energy related to this functionality. This feature associated with the present technique is described in more detail below.

The illustration of the visual cone CV-CAM1 of the first camera CAM1 represents the performance that can be obtained by this first camera CAM1, in particular in a use of barcode reading, thus allowing optimum use of the electronic payment terminal for this specific functionality. Such a front camera can also be used for a facial recognition application.

FIG. 2b for its part makes it possible to view the card passage 102 overall, without the sliding magnetic card, and in particular the bottom 102a and top 102b walls, respectively illustrated with a striped texture and a dotted texture. It can thus be seen that the bottom wall 102a (with stripes) extends beyond the top wall 102b (with dots), so that the opening 102a provided on this bottom wall 102a enables the first camera CAM1 to take photographs, on the vision cone CV-CAM1 also shown on this FIG. 2b.

There will also be noted, on these figures FIG. 2a and FIG. 2b, the representation of a second vision cone CV-CAM2 associated with a second camera CAM2 (not illustrated on these figures FIG. 2a and FIG. 2b). Thus, an additional feature of the present technique lies in the possibility of integrating a second so-called "rear" camera in the same zone of the electronic payment terminal 10, namely its end E1, having a vision angle distinct from the first "front" camera. Thus, an opening 1030 is provided in the "rear" face 103 of the electronic payment terminal 10, this face being substantially perpendicular to the top face 101. This rear camera can also be used for a barcode reading application, more ergonomic than with the front camera. The electronic payment terminal can therefore be used as a portable barcode reader.

The integration of the first and second cameras CAM1 and CAM2 in the electronic payment terminal 10 is described in more detail below, in relation to FIG. 3 and FIG. 5a and FIG. 5b.

FIG. 3 illustrates a cross-sectional view in profile of the end E1 of the electronic payment terminal 10 and makes it possible to view the locations of the card passage 102 and of the magnetic reading head TM of the magnetic card reader, as well as first and second cameras.

The bottom 102a and top 102b walls of the card passage 102 are shown as on FIG. 2b, namely respectively with a striped texture and a dotted texture. The offset between the two walls thus appears clearly, enabling the first camera CAM1 to be able to operate correctly on an optimum vision cone CV-CAM1 possible by virtue of the opening 1020 provided in the bottom wall 102a.

The use of the magnetic reading head TM, under the top wall 102b of the card passage 102, and the dimensions of the bottom 102a and top 102b walls of the card passage, allow optimum reading of a magnetic card (not illustrated here) sliding in this card passage 102.

Moreover, the integration of the first "front" card CAM1 is provided so that the top surface of the camera, or in other words the window of the camera, is not flush with the level of the bottom wall 102a of the card passage, but slightly recessed. This integration guarantees optimum robustness of the camera, in terms of wear that might have been caused by successive passes of a magnetic card in the card passage 102, above the camera CAM1, while offering optimum photographing by the first "front" camera CAM1.

In addition, the objective of compactness of the electronic payment terminal 10 is achieved since integrating the first camera CAM1 in this end zone E1 of the electronic payment terminal 10 does not cause any increase in the size of the electronic payment terminal 10. This is because integrating this first camera CAM1 does not introduce any additional constraints in terms of dimensions, in particular because the opening 1020 allowing photographing by the camera CAM1 is advantageously implemented on a part of the electronic payment terminal already provided for forming the bottom wall 102a of the card passage 102. Integrating the camera CAM1 thus uses spaces left free by the implementation of the card reader TM and the card passage 102 associated with this end E1 of the electronic payment terminal 10.

This performance of optimum integration of a first front camera in the same zone as the one provided for the magnetic card reader and the card passage also makes it possible to envisage the integration of a second "rear" camera CAM2 in the same zone, by means of an optimum arrangement of these two cameras on the same flexible printed circuit, as described above in more detail in relation to FIG. 5*a* and FIG. 5*b*.

FIG. 3 therefore also illustrates the second camera CAM2, with a vision cone CV-CAM2, distinct from that of the first camera CAM1, the operation of which is possible by virtue of the opening 1030 provided in the rear face 103 of the electronic payment terminal 10. The configuration, the dimensions and the positioning of this opening 1030 are advantageously selected to optimise the performances of the second camera CAM2.

In addition, again, the integration of the second camera CAM2 is implemented so that the top surface of the camera, in other words of the window of the camera, is not flush with the level of the rear face 103 and more particularly of the opening 1030, but slightly recessed. This implementation protects the camera against any impacts that the electronic payment terminal 10 might suffer at the rear face 103.

FIG. 4 for its part illustrates a cross-sectional view in profile and of the rear of the end E1 of the electronic payment terminal 10, making it possible to view, at a different angle from FIG. 2*a,* the interior of the electronic payment terminal 10, and therefore in particular the second camera CAM2. The other references illustrated on this figure correspond to those already described in relation to the figures previously described.

The previous figures having illustrated the possibility of integrating two cameras in the same space, with two vision cones oriented differently, FIG. 5*a* and FIG. 5*b* illustrate an embodiment of this integration.

Thus, the cameras CAM1 and CAM2 are integrated on one and the same flexible printed circuit FPC, as illustrated in FIG. 5*a*. The printed circuit FPC is next folded to obtain the two distinct vision angles required respectively for the first camera CAM1 and the second camera CAM2, as illustrated in FIG. 5*b*.

This technical solution constitutes not only a manufacturing advantage, since it requires only one flexible printed circuit, but also an advantage of integration of a front camera and of a rear camera, in one and the same space of the electronic payment terminal, namely its end E1 as already described above. This is because the distinct vision angles of the two cameras can be adapted to the configuration of the electronic payment terminal in which they are integrated, by virtue of the "free" folding of the integrated circuit.

Moreover, this solution of integrating two cameras allows optimum adaptation to the architecture of the electronic payment terminal, and in particular to the other elements integrated at this end E1 of the electronic payment terminal. Thus, the form and the arrangement of the two cameras on the flexible printed circuit FPC can easily be modified and adapted to the architecture of the electronic payment terminal in which the cameras will be integrated.

Finally, as already indicated above, integrating a first "front" camera CAM1 at the bottom wall 102*a* of the card passage 102 at the end E1 of a terminal as described above offers an additional functionality to the electronic payment terminal, namely the detection, by the camera, of a card in the card passage in order to deactivate the "contactless" functionality.

This is because, when such an electronic payment terminal is in a transaction and is seeking a payment means on the part of the user, the "contactless" functionality is activated, i.e. in a mode of detecting the presence of a chip card (at a sufficient and predefined distance from the contactless reader to be able to read the data of the card). This "contactless" functionality is therefore activated before knowing the payment mode that will be selected by the user and consumes energy in this presence detection. This energy consumption can be greatly minimised by deactivating the "contactless" functionality as soon as a magnetic card is detected in the card passage, indicating that the user has chosen a payment means different from "contactless". This deactivation can be done by means of the front camera implemented according to the various embodiments of the solution described above and the following steps, illustrated in FIG. 6, of the method for optimising the operation of an electronic payment terminal:

a step 60 of detecting the presence of a magnetic card 20, via the first front camera CAM1, when the user slides his magnetic card 20 in the card passage and therefore above the opening 1020 provided in the bottom wall 102*a* and enabling photographing by the camera CAM1;

a step 61 of deactivating the "contactless" functionality of the electronic payment terminal 10. For example, the detection of the presence of the card is implemented by the triggering of the camera at the moment of payment by the user, so that, when the payment card of the user passes in front of the camera CAM1, the latter transmits an image to a processor responsible for detecting the presence of a card. This processor can next analyse, in accordance with known image recognition methods, the image taken by the camera, to validate the detection of the presence of a card, and not of another object that might be passed in front of the front camera. Once the presence of a card has been validated, the processor transmits a message for deactivating the "contactless" functionality of the payment terminal, to the module/processor responsible for implementing this functionality.

For some payment terminals, the camera is activated permanently and films any object that passes in its vision cone, so that detecting the presence of the card in the card passage does not require any particular triggering of the camera.

The invention claimed is:

1. An electronic payment terminal comprising:
   at least one processor;
   a housing in the form substantially of a right-angled parallelepiped formed by an assembly of a plurality of faces including a top face intended to face a user of said electronic payment terminal;
   a magnetic-memory card reader and a groove, referred to as a card passage, wherein a magnetic-memory card is intended to slide; and
   at least one first front camera,
   wherein said card passage extends in a plane substantially parallel to said top face of said electronic payment terminal, at one end of said housing of said electronic payment terminal, a part of a bottom wall of said card passage extending beyond a top wall of said card passage,
   wherein said at least one first front camera is integrated in said end of said electronic payment terminal, in a plane substantially parallel to said top face of said electronic payment terminal, below said bottom wall of said card passage extending beyond the top wall of said card passage,
   wherein a visual cone of said first front camera is oriented mainly in a direction going from said bottom wall towards said top face of said electronic payment terminal, wherein the first front camera is configured to detect presence of a magnetic-memory card, when the user slides the magnetic-memory card in the card passage, and to take an image and transmit the image to the at least one processor, and wherein the at least one processor is configured to validate the detection of the presence of the magnetic-memory card with image recognition and transmit a message for deactivating a contactless functionality of the payment terminal.

2. The electronic payment terminal according to claim 1, wherein said bottom wall of said card passage has an opening located opposite said at least one first front camera, and an exterior surface of said at least one first front camera is located below the plane of said bottom wall of said card passage.

3. The electronic payment terminal according to claim 1, which further comprises a second camera at said end of said electronic payment terminal, in a plane not parallel to said top face of said electronic payment terminal, said first and second cameras having two distinct vision angles.

4. The electronic payment terminal according to claim 3, which further comprises an opening provided in a rear face connecting said top face and a bottom face of said electronic payment terminal, said opening being located opposite said second camera, and wherein an exterior surface of said second camera is located below the plane of said rear face.

5. The electronic payment terminal according to claim 3, wherein said first and second cameras are integrated on one and the same flexible printed circuit.

6. A method comprising:
optimizing operation of an electronic payment terminal which comprises:
a housing in the form substantially of a right-angled parallelepiped formed by an assembly of a plurality of faces including a top face intended to face a user of said electronic payment terminal;
a magnetic-memory card reader and a groove, referred to as a card passage, wherein a magnetic-memory card is intended to slide; and
at least one first front camera,
wherein said card passage extends in a plane substantially parallel to said top face of said electronic payment terminal, at one end of said housing of said electronic payment terminal, a part of a bottom wall of said card passage extending beyond a top wall of said card passage,
wherein said at least one first front camera is integrated in said end of said electronic payment terminal, in a plane substantially parallel to said top face of said electronic payment terminal, below said bottom wall of said card passage extending beyond the top wall of said card passage,
wherein a visual cone of said first front camera is oriented mainly in a direction going from said bottom wall towards said top face of said electronic payment terminal, and
wherein the optimizing comprises:
detecting, via said at least one first front camera, presence of a magnetic card in the card passage; and
deactivating a contactless functionality of said electronic payment terminal in response to detecting the presence of the magnetic card.

7. The method according to claim 6, wherein the optimizing further comprises:
the first front camera detecting the presence of a magnetic-memory card when the user slides the magnetic-memory card in the card passage, taking an image and transmitting the image to at least one processor, and
the at least one processor validating the detection of the presence of the card with image recognition and transmitting a message for deactivating a contactless functionality of the payment terminal.

8. The method according to claim 6, wherein said bottom wall of said card passage has an opening located opposite said at least one first front camera, and an exterior surface of said at least one first front camera is located below the plane of said bottom wall of said card passage.

9. The method according to claim 6, wherein the electronic payment terminal further comprises a second camera at said end of said electronic payment terminal, in a plane not parallel to said top face of said electronic payment terminal, said first and second cameras having two distinct vision angles.

10. The method according to claim 6, wherein the electronic payment terminal further comprises an opening provided in a rear face connecting said top face and a bottom face of said electronic payment terminal, said opening being located opposite said second camera, and wherein an exterior surface of said second camera is located below the plane of said rear face.

11. The method according to claim 10, wherein said first and second cameras are integrated on one and the same flexible printed circuit.

12. A non-transitory computer-readable medium comprising program code instructions stored thereon for executing a method for optimizing operation of an electronic payment terminal, when the program code instructions are executed by a processor, wherein the electronic payment terminal comprises:
a housing in the form substantially of a right-angled parallelepiped formed by an assembly of a plurality of faces including a top face intended to face a user of said electronic payment terminal;
a magnetic-memory card reader and a groove, referred to as a card passage, wherein a magnetic-memory card is intended to slide; and
at least one first front camera,
wherein said card passage extends in a plane substantially parallel to said top face of said electronic payment terminal, at one end of said housing of said electronic payment terminal, a part of a bottom wall of said card passage extending beyond a top wall of said card passage,
wherein said at least one first front camera is integrated in said end of said electronic payment terminal, in a plane substantially parallel to said top face of said electronic payment terminal, below said bottom wall of said card passage extending beyond the top wall of said card passage,
wherein a visual cone of said first front camera is oriented mainly in a direction going from said bottom wall towards said top face of said electronic payment terminal, and
wherein the method for optimizing comprises:
detecting, via said at least one first front camera, presence of a magnetic card in the card passage; and
deactivating a contactless functionality of said electronic payment terminal in response to detecting the presence of the magnetic card.

* * * * *